(12) United States Patent
Jung et al.

(10) Patent No.: US 10,469,770 B2
(45) Date of Patent: Nov. 5, 2019

(54) CAMERA HAVING INFRARED RAY REFLECTOR

(71) Applicant: HANWHA TECHWIN CO., LTD., Seongnam-si (KR)

(72) Inventors: Sung Chan Jung, Changwon-si (KR); Ji Hwan Bae, Changwon-si (KR); Woon Do Jung, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/493,315

(22) Filed: Apr. 21, 2017

(65) Prior Publication Data

US 2017/0339351 A1 Nov. 23, 2017

(30) Foreign Application Priority Data

May 20, 2016 (KR) .......................... 10-2016-0062173

(51) Int. Cl.
| | |
|---|---|
| *H04N 5/33* | (2006.01) |
| *G02B 5/08* | (2006.01) |
| *G02B 13/14* | (2006.01) |
| *H04N 5/225* | (2006.01) |

(52) U.S. Cl.
CPC ............. *H04N 5/33* (2013.01); *G02B 5/0808* (2013.01); *G02B 13/14* (2013.01); *H04N 5/2253* (2013.01); *H04N 5/2254* (2013.01); *H04N 5/2256* (2013.01)

(58) Field of Classification Search
CPC ...... H04N 5/33; H04N 5/2256; H04N 5/2253; H04N 5/2254; G02B 5/0808; G02B 13/14
See application file for complete search history.

(56) References Cited

U.S. PATENT DOCUMENTS 6,628,335 B1 * 9/2003 Numazaki ............. G06F 3/0304
348/370

FOREIGN PATENT DOCUMENTS

| JP | 20015063 A | 1/2001 |
|---|---|---|
| JP | 4740969 B2 | 8/2011 |
| KR | 1020130052861 A | 5/2013 |
| KR | 1020130065070 A | 6/2013 |
| KR | 1020140123864 A | 10/2014 |

OTHER PUBLICATIONS

KR 20140123864 Translation (Year: 2014).*

* cited by examiner

*Primary Examiner* — Twyler L Haskins
*Assistant Examiner* — Angel L Garces-Rivera
(74) *Attorney, Agent, or Firm* — Sughrue Mion, PLLC

(57) ABSTRACT

A camera, including a lens assembly and a plurality of infrared ray (IR) light sources arranged around the lens assembly, has a photographing target area classified as a main irradiation area and an external irradiation area. The main irradiation area is set not to exceed a half-power angle of the IR light sources. The external irradiation area is set to exceed the half-power angle of the IR light sources. A reflector is installed corresponding to the IR light sources. IRs reflected by the reflector reach the external irradiation area.

20 Claims, 7 Drawing Sheets

CAMERA HAVING INFRARED RAY REFLECTOR

CROSS-REFERENCE TO THE RELATED APPLICATION

This application claims priority from Korean Patent Application No. 10-2016-0062173, filed on May 20, 2016, in the Korean Intellectual Property Office, the disclosure of which is incorporated herein in its entirety by reference.

BACKGROUND

1. Field

One or more exemplary embodiments relate to a camera, and more particularly, to a camera in which infrared ray light sources are arranged around a lens assembly.

2. Description of the Related Art

A camera having infrared ray light sources such as infrared ray (IR) light emitting diodes (LEDs) turn on the IR light sources in order to perform photographing under an environment of low luminance or an environment where there is no visible ray.

Figure 1:
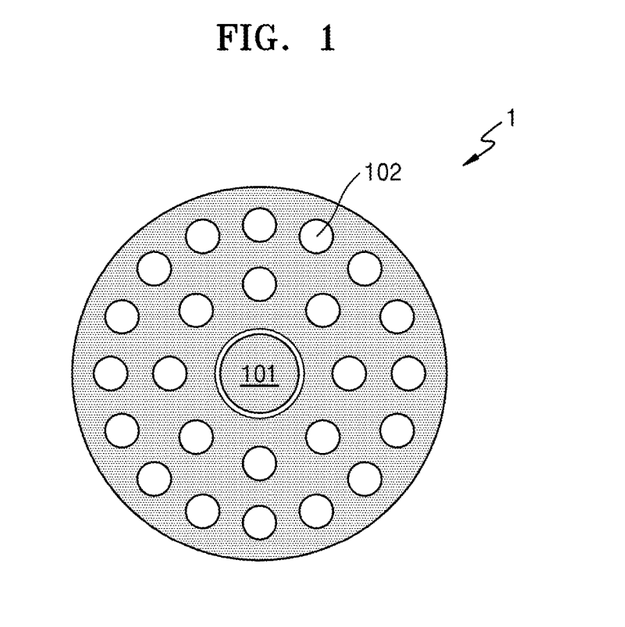
FIG. 1 is a front view of a camera in which infrared ray (IR) light sources are arranged around a lens assembly.

FIG. 1 is a front view of a camera 1 in which IR light sources 102 are arranged around a lens assembly 101.

Referring to FIG. 1, the IR light sources 102 form coaxial circles about the lens assembly 101. Although in FIG. 1 the IR light sources 102 are arranged in two rows, the IR light sources 102 may be arranged only in a row. In addition, the IR light sources 102 may be arranged only on a left side and a right side of the lens assembly 101 to form a rectangle, so as to correspond to a capture screen.

Figure 2:
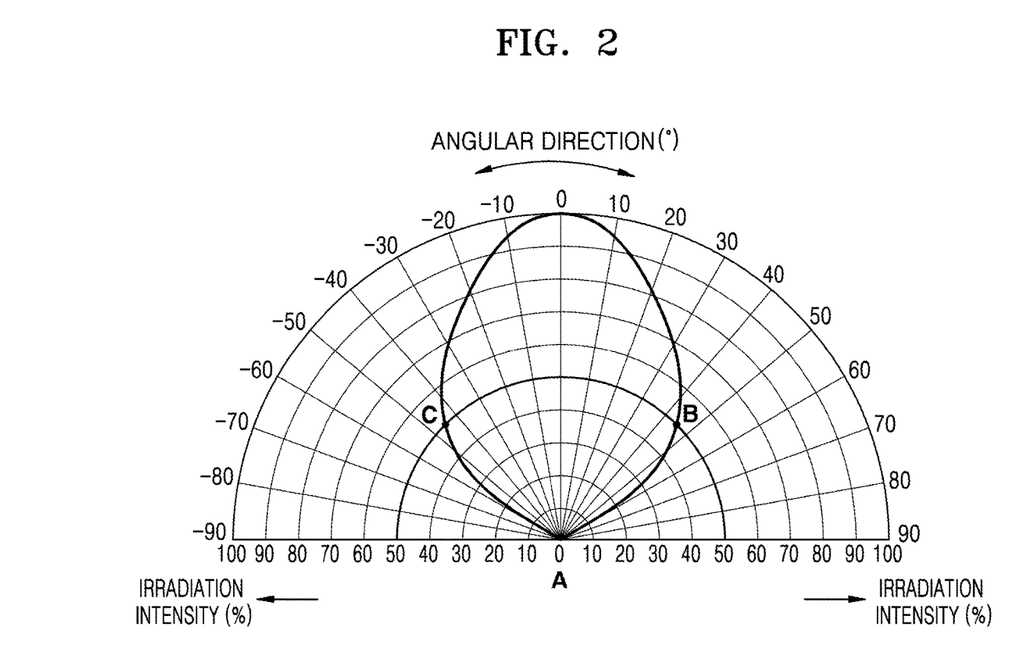
FIG. 2 is a graph showing a radiation characteristic of one IR light-emitting diode (LED) as the IR light source.

FIG. 2 shows a radiation characteristic of one IR LED as the IR light source.

Referring to FIG. 2, the IR LED irradiates IRs so that a direction of the 0° angle at a point "A" becomes an optical axis. Irradiation intensity in the direction of the 0° angle is 100%. Irradiation intensities at 10° angles towards left and right sides of the 0° angle are about 93%. Irradiation intensities at 20° angles towards left and right sides of the 0° angle are about 81%. Irradiation intensities at 30° angles towards left and right sides of the 0° angle are about 70%. Irradiation intensities at 40° angles towards left and right sides of the 0° angle are about 55%. Irradiation intensities at 45° angles towards left and right sides of the 0° angle are about 50%.

Here, angles at points B and C where the irradiation intensities are 50% (in FIG. 2, 45° angles in left and right directions) are referred to as half-power angles. In other regions than the half-power angle, the irradiation angle greatly decreases.

Figure 3:
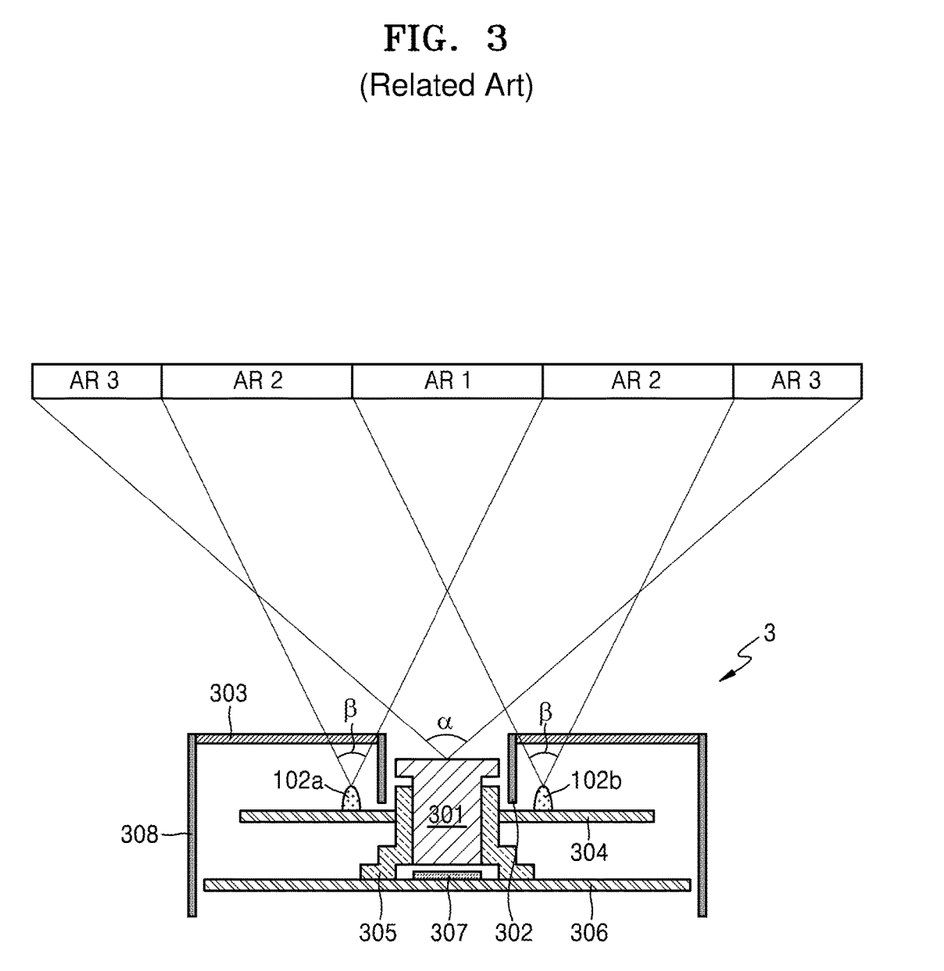
FIG. 3 is a diagram illustrating a camera of a first type, in which IR light sources are arranged, according to the related art, and a status of irradiating IRs from the camera.

FIG. 3 is a diagram of a first-type camera 3, in which IR light sources 102a and 102b are arranged, according to the related art, and IRs irradiated from the camera 3. Referring to FIG. 3, the first-type camera 3 according to the related art and a status of irradiating IRs from the camera 3 will be described below.

The IR light sources 102a and 102b of the camera 3 of the first type may not be arranged in two rows like in FIG. 1, but in one row. Reference numeral 308 denotes a case and reference numeral 303 denotes an IR window. A barrier wall 302 prevents diffused reflection of the IR.

An image sensor 307 and a lens holder 305 are mounted on a printed circuit board (PCB) 306 for an image sensor. Reference numeral 301 denotes a lens assembly. The IR light sources 102a and 102b are mounted on a PCB 304 for IR light sources.

Photographing target areas AR1 to AR3 corresponding to a viewing angle a of the camera 3 may be classified as main irradiation areas AR1 and AR2 and an external irradiation area AR3. The main irradiation areas AR1 and AR2 are regions that do not exceed the half-power angle (β) of the IR light sources 102a and 102b. The external irradiation area AR3 is a region exceeding the half-power angle (β) of the IR light sources 102a and 102b.

According to the camera 3 of the first type according to the related art, if the irradiation intensity of the IR light sources 102a and 102b is set to be high, the external irradiation area AR3 may be photographed so as not to be dark, but a frequency of generating a screen saturation effect may increase.

When the irradiation intensity of the IR light sources 102a and 102b is set so as not to be high, the frequency of generating the screen saturation effect decreases, but the external irradiation area AR3 is photographed dark.

Figure 4:
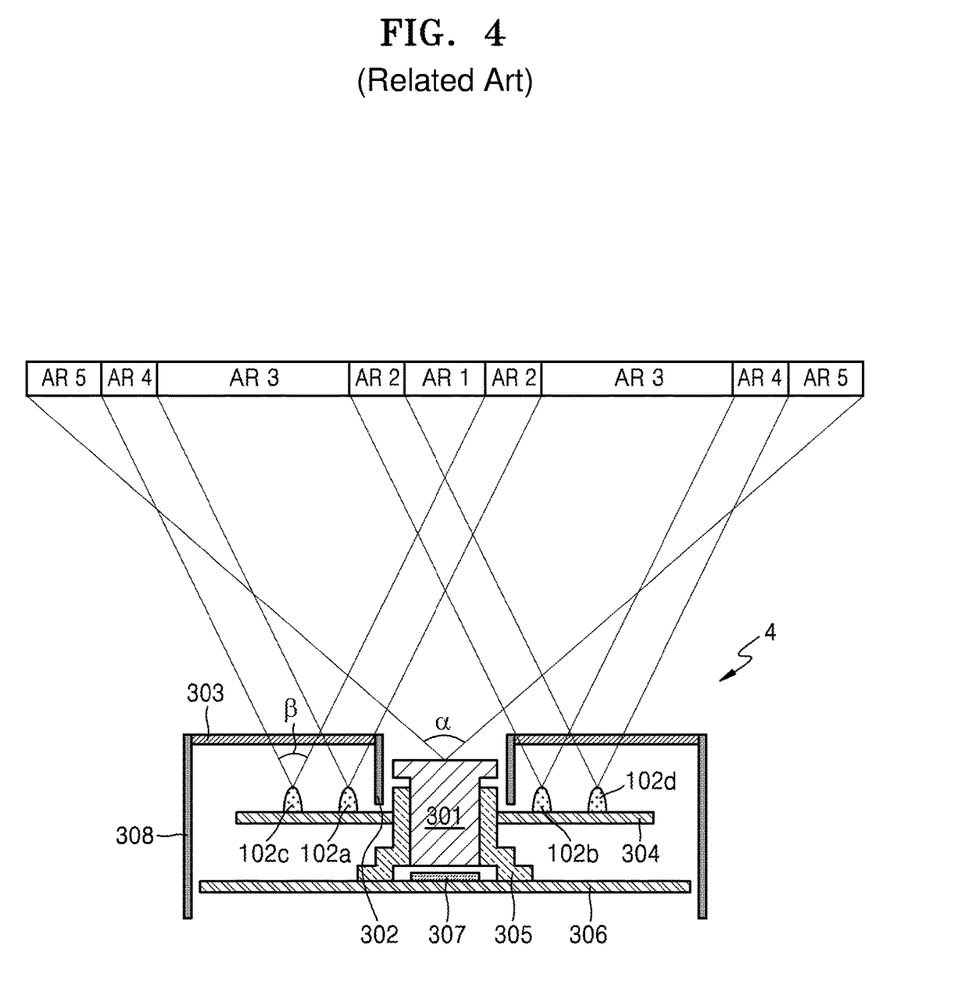
FIG. 4 is a diagram illustrating a camera of a second type, in which IR light sources are arranged, according to the related art, and a status of irradiating IRs from the camera.

FIG. 4 is a diagram of a second type camera 4, in which IR light sources 102a to 102d are arranged, according to the related art, and IRs irradiated from the camera 4.

Figure 5:
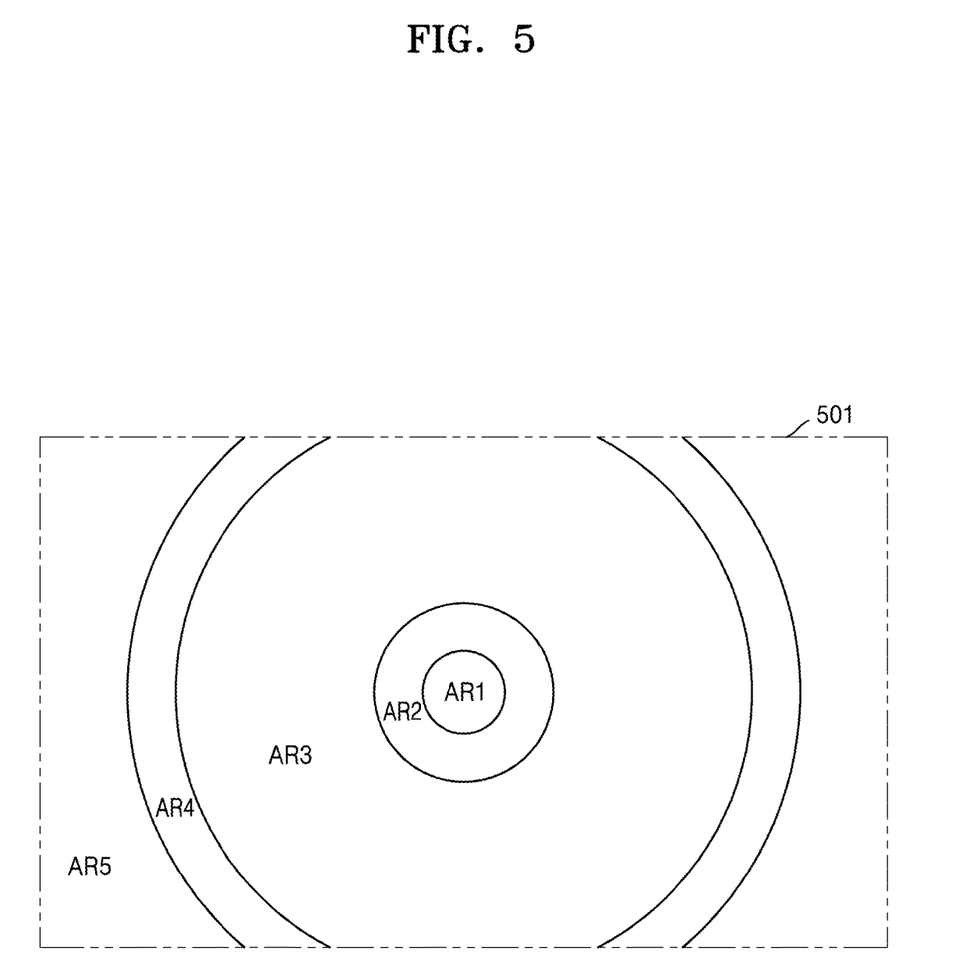
FIG. 5 is a diagram of a photographing screen of a camera corresponding to a photographing target area of FIG. 4.

FIG. 5 is a diagram illustrating a photographing screen 501 of a camera, the photographing screens corresponding to the photograph target areas AR1 to AR5 of FIG. 4.

Referring to FIGS. 4 and 5, the camera 4 of the second type according to the related art and a status of irradiating IRs from the camera 4 will be described below.

The IR light sources 102a to 102d of the camera 4 of the second type are arranged in two rows as shown in FIG. 1. That is, the camera 4 includes first IR light sources 102c and 102d and second IR light sources 102a and 102b. The first IR light sources 102c and 102d are arranged around the lens assembly 301. The second IR light sources 102a and 102b are arranged between the lens assembly 301 and the first IR light sources 102c and 102d.

Reference numeral 308 denotes a case and reference numeral 303 denotes an IR window. A barrier wall 302 prevents diffused reflection of the IR.

An image sensor 307 and a lens holder 305 are mounted on a PCB 306 for an image sensor. The IR light sources 102a to 102d are mounted on a PCB 304 for IR light sources.

Photographing target areas AR1 to AR5 corresponding to a viewing angle a of the camera 4 may be classified as main irradiation areas AR1 to AR4 and an external irradiation area AR5. The main irradiation areas AR1 to AR4 are regions that do not exceed the half-power angle (β) of the first IR light sources 102c and 102d. The external irradiation area AR5 is a region exceeding the half-power angle (β) of the first IR light sources 102c and 102d.

According to the camera 4 of the second type according to the related art, if the irradiation intensity of the IR light sources 102a to 102d is set to be high, the external irradiation area AR5 may be photographed so as not to be dark, but a frequency of generating a screen saturation effect may increase.

When the irradiation intensity of the IR light sources 102a to 102d is set so as not to be high, the frequency of generating the screen saturation effect decreases, but the external irradiation area AR4 is photographed dark.

The information in the related art described above are considered as matters that have been addressed by the inventors to derive the present inventive concept, or as matters discovered during the course of deriving the present inventive concept. As such, the information in the related art may not be simply referred to as information which was known to the general public prior to the filing of the present disclosure.

SUMMARY

One or more exemplary embodiments include a camera capable of photographing an external irradiation area so as not to be dark, even when an irradiation intensity of IR light sources is not set to be high in order to reduce a screen saturation effect.

Additional aspects will be set forth in part in the description which follows and, in part, will be apparent from the description, or may be learned by practice of the presented embodiments.

According to one or more exemplary embodiments, a camera includes a lens assembly, a plurality of infrared ray (IR) light sources arranged around the lens assembly, and a reflector installed to correspond to the IR light sources, wherein a photographing target area of the camera is classified as a main irradiation area and an external irradiation area, the main irradiation area is set not to exceed a half-power angle of the IR light sources, the external irradiation area is set to exceed the half-power angle of the IR light sources, and the reflector is configured such that IRs reflected by the reflector reach the external irradiation area.

According to the camera, a reflector is installed corresponding to the IR light sources, and IRs reflected by the reflector reach the external irradiation area.

Therefore, even when the irradiation intensity of the IR light sources is not set to be high in order to reduce the screen saturation effect, the external irradiation area may be photographed so as not to be dark.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

The following description and the attached drawings are provided for better understanding of the invention, and descriptions of techniques or structures related to the present disclosure which would be obvious to one of ordinary skill in the art will be omitted.

The specification and drawings should be considered in a descriptive sense only and not for purposes of limitation. Therefore, the scope of the present disclosure is defined by the appended claims. The terms and words which are used in the present specification and the appended claims should not be construed as being confined to common meanings or dictionary meanings but should be construed as meanings and concepts matching the technical spirit of the present disclosure in order to describe the present disclosure in the best fashion.

Hereinafter, one or more exemplary embodiments of the present disclosure will be described in detail with reference to accompanying drawings.

Figure 6:
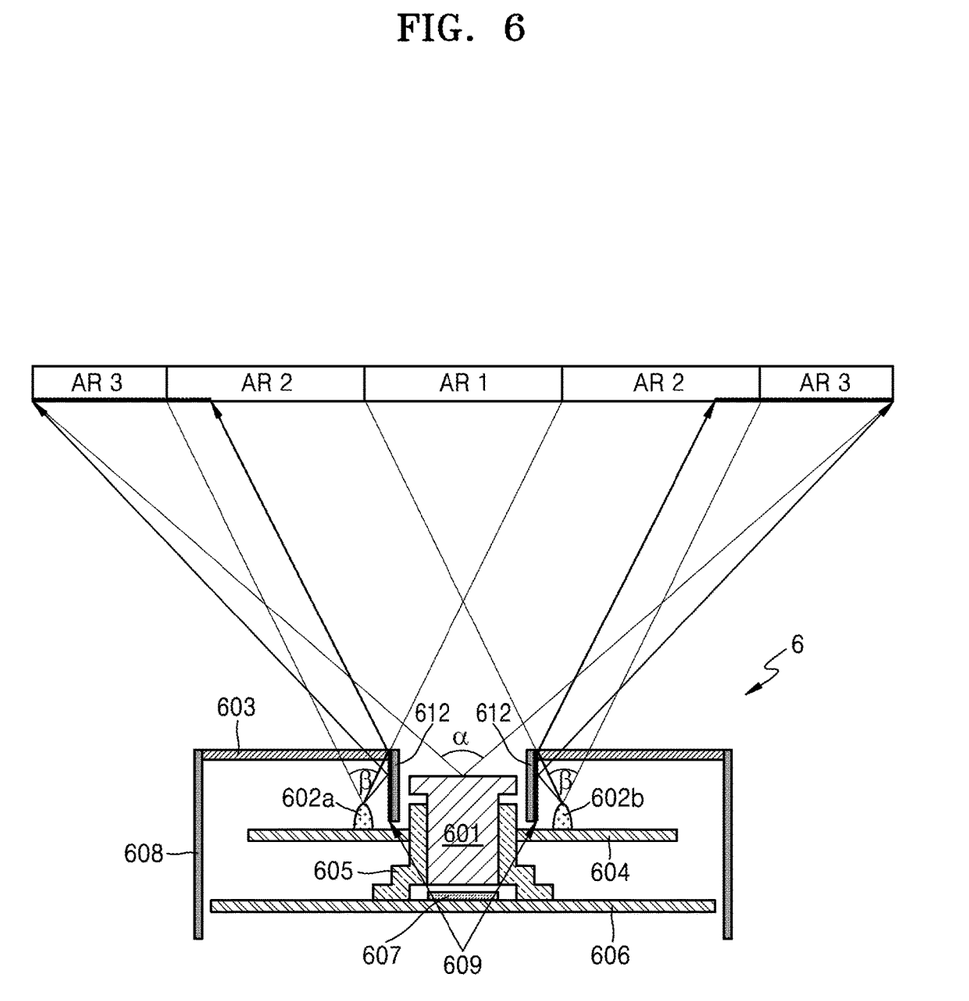
FIG. 6 is a diagram of a camera of a first type according to an exemplary embodiment and a status of irradiating IRs from the camera.

FIG. 6 is a diagram of a camera 6 of a first type according to an exemplary embodiment and a status of irradiating infrared rays (IRs) from the camera 6. The camera 6 according to the exemplary embodiment and the status of irradiating IRs from the camera 6 will be described below with reference to FIG. 6.

IR light sources 602a and 602b of the camera 6 according to the exemplary embodiment are not arranged in two rows as shown in FIG. 1, but are arranged only in one row. The IR light sources 602a and 602b are arranged circularly around a lens assembly 601. Reference numeral 608 denotes a case. A circular barrier wall 612 surrounding the lens assembly 601 prevents diffused reflection of IRs. In the present exemplary embodiment, the barrier wall 612 includes a plastic material. An IR window 603 performing as a cover has an IR transmission of about 85% to about 95%. An image sensor 607 and a lens holder 605 are mounted on a PCB 606 for an image sensor having a disc shape. A PCB 604 for an IR light source having a disc shape is supported by the lens holder 605, and the IR light sources 602a and 602b are mounted on the PCB 604.

Photographing target areas AR1 to AR3 corresponding to a viewing angle a of the camera 6 may be classified as main irradiation areas AR1 and AR2 and an external irradiation area AR3. The main irradiation areas AR1 and AR2 are regions that do not exceed the half-power angle (β) of the IR light sources 602a and 602b. The external irradiation area AR3 is a region exceeding the half-power angle (β) of the IR light sources 602a and 602b.

A reflector 609 is installed to correspond to the IR light sources 602a and 602b. In more detail, the barrier wall 612 is formed between the lens assembly 601 and the IR light sources 602a and 602b, and the reflector 609 is attached to the barrier wall 612. In the present exemplary embodiment, the reflector 609 formed between the IR light sources 602a and 602b and the barrier wall 612 forms a circle from a front of the camera 6. Some of the IRs irradiated from the IR light sources 602a and 602b are reflected by the reflector 609 having a circular shape. When the reflector 609 is installed corresponding to the IR light sources 602a and 602b, the reflector 609 may be obtained by attaching a mirror on the barrier wall 612 to face in a direction towards the IR light sources 602a and 602b. Otherwise, metal, e.g., aluminum, may be deposited or coated on the barrier wall 612 to face in a direction towards the IR light sources 602a and 602b, so as to form the reflector 609. Otherwise, the reflector 609 may be obtained by attaching reflective tape on the barrier wall 612 to face in the direction towards the IR light sources 602a and 602b.

The IRs reflected by the reflector 609 reach the external irradiation area AR3. In the present exemplary embodiment, the reflector 609 may be attached to be perpendicular to the PCB 604 for IR light sources. Accordingly, the IRs reflected by the reflector 609 may reach a part of the main irradiation areas, as well as the external irradiation area AR3.

In summary, the reflector 609 is installed corresponding to the IR light sources 602a and 602b, and the IRs reflected from the reflector 609 reach the external irradiation area AR3. Therefore, even when the irradiation intensity of the IR light sources is not set to be high in order to reduce a screen saturation effect, the external irradiation area may be photographed so as not to be dark.

Figure 7:
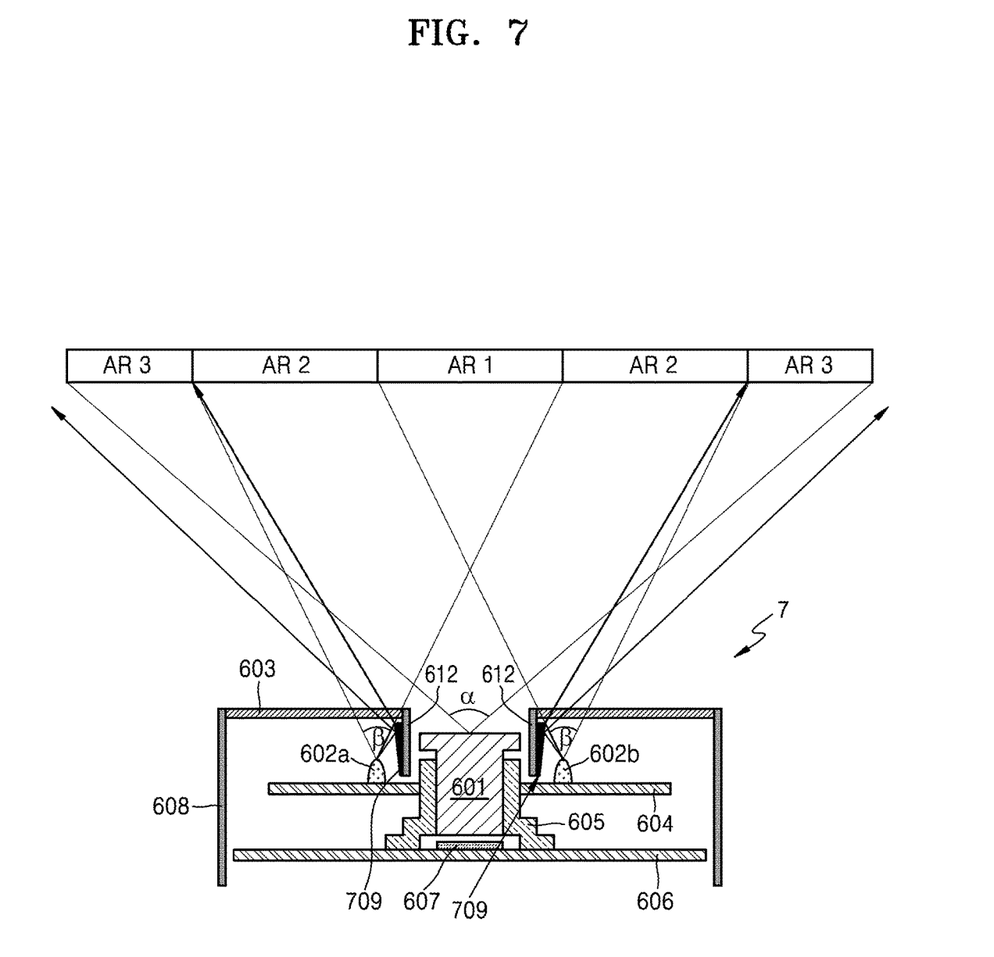
FIG. 7 is a diagram of a camera of a second type according to another exemplary embodiment and a status of irradiating IRs from the camera.

FIG. 7 is a diagram of a camera 7 according to another exemplary embodiment and a status of irradiating IRs from the camera 7. In FIG. 7, the same reference numerals as those of FIG. 6 denote the same elements. Thus, differences of the present exemplary embodiment illustrated with reference to FIG. 7 from the exemplary embodiment illustrated with FIG. 6 will be described below.

An upper portion of a reflector 709 is inclined towards the IR light sources 602a and 602b on a line perpendicular to the PCB 604 for IR light sources. Accordingly, the IRs reflected by the reflector 709 may reach a region outside the photographing target area, as well as the external irradiation area AR3.

In summary, the reflector 709 is installed corresponding to the IR light sources 602a and 602b, and the IRs reflected by the reflector 709 reach the external irradiation area AR3.

Figure 8:
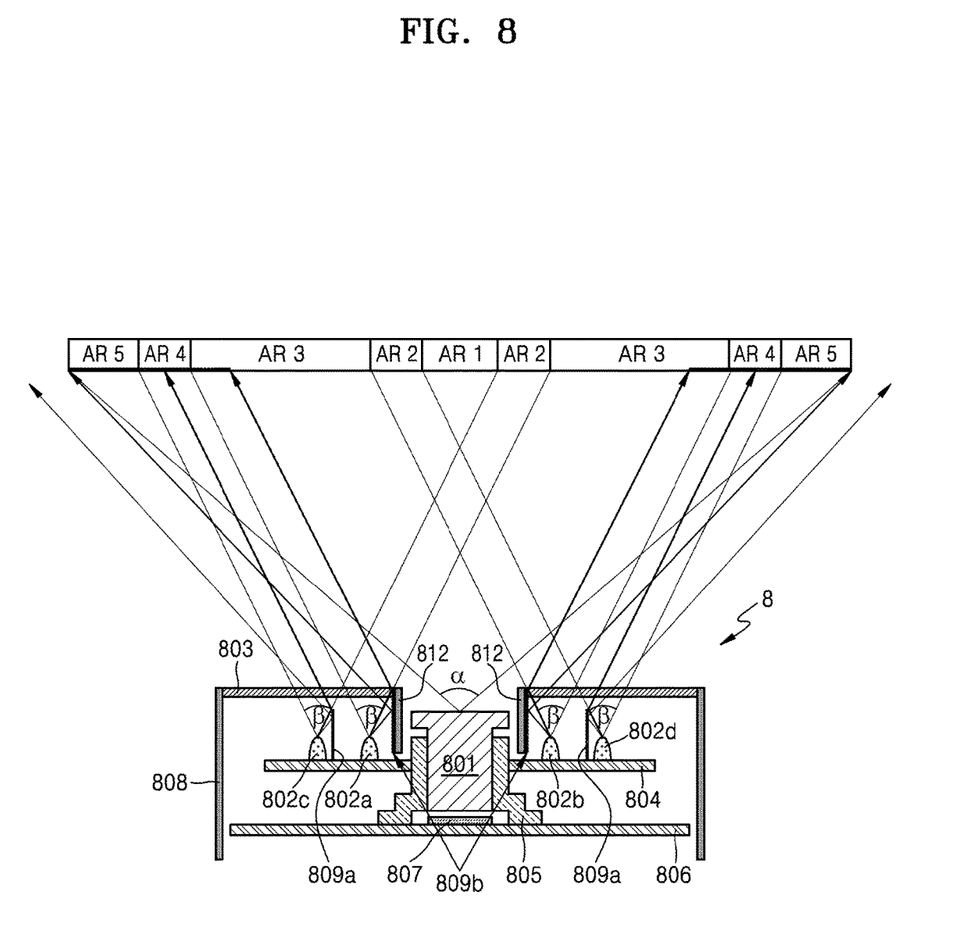
FIG. 8 is a diagram of a camera of a third type according to another exemplary embodiment and a status of irradiating IRs from the camera.

FIG. 8 is a diagram of a camera 8 according to another exemplary embodiment and a status of irradiating IRs from the camera 8. Referring to FIGS. 8 and 5, the camera 8 according to the present exemplary embodiment and the status of irradiating the IRs from the camera 8 will be described below.

IR light sources 802a to 802d of the camera 8 according to the present exemplary embodiment are arranged in two rows like the example of FIG. 1. That is, the camera 8 includes first IR light sources 802c and 802d and second IR light sources 802a and 802b. The first IR light sources 802c and 802d are arranged circularly around a lens assembly 801. The second IR light sources 802a and 802b are arranged circularly between the lens assembly 801 and the first IR light sources 802c and 802d.

Reference numeral 808 denotes a case. A circular barrier wall 812 surrounding the lens assembly 801 prevents diffused reflection of IRs. In the present exemplary embodiment, the barrier wall 812 includes a plastic material. An IR window 803 performing as a cover has an IR transmission of about 85% to about 95%.

An image sensor 807 and a lens holder 805 are mounted on a PCB 806 for an image sensor having a disc shape. A PCB 804 for an IR light source having a disc shape is supported by the lens holder 805, and the IR light sources 802a and 802b are mounted on the PCB 804.

Photographing target areas AR1 to AR5 corresponding to a viewing angle a of the camera 8 may be classified as main irradiation areas AR1 to AR4 and an external irradiation area AR5. The main irradiation areas AR1 to AR4 are regions that do not exceed the half-power angle (β) of the first IR light sources 802c and 802d. The external irradiation area AR5 is a region exceeding the half-power angle (β) of the first IR light sources 802c and 802d.

A first reflector 809a having a circular shape is installed corresponding to the first IR light sources 802c and 802d. In the present exemplary embodiment, the first reflector 809a is formed between the first IR light sources 802c and 802d and the second IR light sources 802a and 802b. A second reflector 809b is installed corresponding to the second IR light sources 802a and 802b. In the present exemplary embodiment, the second reflector 809b is formed between the second IR light sources 802a and 802b and the barrier wall 812. The first reflector 809a and the second reflector 809b respectively form circular shapes in front of the camera 8. A diameter of the first reflector 809a is greater than that of the second reflector 809b.

In more detail, the barrier wall 812 is formed between the lens assembly 801 and the second IR light sources 802a and 802b, and the second reflector 809b is attached to the barrier wall 812.

The first reflector 809a is formed on a PCB 804 where driving circuits of the first IR light sources 802c and 802d and the second IR light sources 802a and 802b are formed, that is, the PCB 804 for IR light sources.

Some of the IRs irradiated from the first IR light sources 802c and 802d is reflected by the first reflector 809a. Some of IRs irradiated from the second IR light sources 802a and 802b are reflected by the second reflector 809b.

When the first reflector 809a is installed corresponding to the first IR light sources 802c and 802d, a plastic plate may be formed on the PCB 804, and then, a mirror may be attached to the plastic plate to face in a direction towards the first IR light sources 802c and 802d to form the first reflector 809a. Otherwise, metal may be deposited or coated on the plastic plate to face in a direction towards the first IR light sources 802c and 802d to form the first reflector 809a. Otherwise, the first reflector 809a may be installed by attaching reflective tape to the plastic plate to face in a direction towards the first IR light sources 802c and 802d.

When the second reflector 809b is installed corresponding to the second IR light sources 802a and 802b, the second reflector 809b may be formed by attaching a mirror to the barrier wall 812 to face in the direction towards the second IR light sources 802a and 802b. Otherwise, the second reflector 809b may be installed by depositing or coating metal on the barrier wall 812 to face in the direction towards the second IR light sources 802a and 802b. Otherwise, the second reflector 809b may be installed by attaching reflective tape on the barrier wall 812 to face in the direction towards the second IR light sources 802a and 802b.

IRs reflected by the first reflector 809a and the second reflector 809b reach the external irradiation area AR5. In the present exemplary embodiment, the IRs reflected by the second reflector 809b also reach a part of the main irradiation areas, as well as the external irradiation area AR5. The IRs reflected by the first reflector 809a reach the area outside of the photographing target area and a part of the main irradiation areas, as well as the external irradiation area AR5.

That is, the IRs reflected by the first reflector 809a and the second reflector 809b reach the external irradiation area AR5. Therefore, even when the irradiation intensity of the IR light sources is not set to be high in order to reduce a screen saturation effect, the external irradiation area may be photographed so as not to be dark.

As described above, according to the one or more exemplary embodiments, the reflector is installed corresponding to the IR light sources and the IRs reflected by the reflector reach the external irradiation area.

Therefore, even when the irradiation intensity of the IR light sources is not set to be high in order to reduce a screen saturation effect, the external irradiation area may be photographed so as not to be dark.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A camera comprising:
a lens assembly;
a plurality of infrared ray (IR) light sources arranged around the lens assembly and configured to emit IR light;
a tube-shape barrier wall surrounding the lens assembly, and formed between and spaced apart from the lens assembly and the IR light sources, respectively; and
a tube-shape reflector surrounding tube-shape barrier wall and installed to correspond to the IR light sources,
wherein a photographing target area of the camera is classified as a main irradiation area and an external irradiation area,
wherein the main irradiation area is set not to exceed a half-power angle of the IR light sources,
wherein the external irradiation area is set to exceed the half-power angle of the IR light sources, and
wherein the tube-shape reflector is configured such that the IR light emitted at angles that exceed the half-power angle from the plurality of IR light sources are reflected by the tube-shape reflector to reach the external irradiation area by widening the angles of the IR light.

2. The camera of claim 1, further comprising:
a first printed circuit board (PCB) on which an image sensor and a lens holder are mounted; and
a second PCB on which the IR light sources are mounted, wherein the second PCB is supported by the lens holder.

3. The camera of claim 2, wherein the tube-shape reflector is perpendicular to the second PCB so that IRs reflected by the tube-shape reflector reach a part of the main irradiation area, as well as the external irradiation area.

4. The camera of claim 2, wherein an upper portion of the tube-shape reflector is inclined towards the IR light sources on a line perpendicular to the second PCB, and
wherein IRs reflected by the tube-shape reflector reach an area outside of the photographing target area, as well as the external irradiation area.

5. A camera comprising:
a lens assembly;
a plurality of infrared ray (IR) light sources arranged around the lens assembly and configured to emit IR light; and
a tube-shape reflector installed to correspond to the IR light sources,
wherein a photographing target area of the camera is classified as a main irradiation area and an external irradiation area,
wherein the main irradiation area is set not to exceed a half-power angle of the IR light sources,
wherein the external irradiation area is set to exceed the half-power angle of the IR light sources,
wherein the tube-shape reflector is configured such that the IR light emitted at angles that exceed the half-power angle from the plurality of IR light sources are reflected by the tube-shape reflector to reach the external irradiation area by widening the angles of the IR light,
wherein the camera further comprises a tube-shape barrier wall surrounding the lens assembly, and formed between the lens assembly and the IR light sources, and
wherein the tube-shape reflector is attached to the tube-shape barrier wall and surrounds the tube-shape barrier wall.

6. The camera of claim 5, wherein the tube-shape reflector is a mirror on the tube-shape barrier wall to face in a direction towards the IR light sources.

7. The camera of claim 5, wherein the tube-shape reflector is metal on the tube-shape barrier wall to face in a direction towards the IR light sources.

8. The camera of claim 5, wherein the tube-shape reflector is a reflective tape on the tube-shape barrier wall to face in a direction towards the IR light sources.

9. A camera comprising:
a lens assembly;
a first plurality of infrared ray (IR) light sources arranged around the lens assembly;
a second plurality of IR light sources arranged between the lens assembly and the first plurality of IR light sources;
a tube-shape barrier wall surrounding the lens assembly, and formed between and spaced apart from the lens assembly and the second plurality of IR light sources, respectively;
a first tube-shape reflector surrounding the second plurality of IR light sources, and formed between the first plurality of IR light sources and the second plurality of IR light sources; and
a second tube-shape reflector being attached to the tube-shape barrier wall,
wherein a photographing target area of the camera is classified as a main irradiation area and an external irradiation area,
wherein the main irradiation area is set not to exceed a half-power angle of the first plurality of IR light sources,
wherein the external irradiation area is set to exceed the half-power angle of the first plurality of IR light sources, and
wherein the first tube-shape reflector and the second tube-shape reflector are configured such that IR light emitted from the first plurality of IR light sources and the second plurality of IR light sources and reflected by the first tube-shape reflector and the second tube-shape reflector, respectively, reach the external irradiation area.

10. The camera of claim 9,
wherein the first tube-shape reflector is positioned between the first plurality of IR light sources and the second plurality of IR light sources.

11. The camera of claim 10, further comprising a printed circuit board (PCB) on which the first plurality of IR light sources and the second plurality of IR light sources are positioned,
wherein the first tube-shape reflector is on the PCB.

12. The camera of claim 11, further comprising a plastic plate positioned on the PCB, wherein the first tube-shape reflector is a mirror to the plastic plate to face in a direction towards the first plurality of IR light sources.

13. The camera of claim 11, further comprising a plastic plate positioned on the PCB,
wherein the first tube-shape reflector is installed by depositing or coating metal on the plastic plate to face in a direction towards the first plurality of IR light sources.

14. The camera of claim 11, further comprising a plastic plate positioned on the PCB, and
wherein the first tube-shape reflector is a reflective tape to the plastic plate to face in a direction towards the first plurality of IR light sources.

15. The camera of claim 10, wherein the second tube-shape reflector is a mirror on the tube-shape barrier wall to face in a direction towards the second plurality of IR light sources.

16. The camera of claim 10, wherein the second tube-shape reflector is metal on the tube-shape barrier wall to face in a direction towards the second plurality of IR light sources.

17. The camera of claim 10, wherein the second tube-shape reflector is a reflective tape on the tube-shape barrier wall to face in a direction towards the second plurality of IR light sources.

18. A camera comprising:
a lens assembly;
a plurality of infrared ray (IR) light sources arranged circularly around the lens assembly;
a tube-shape barrier wall surrounding the lens assembly, the tube-shape barrier wall formed between and spaced apart from the lens assembly and the plurality of IR light sources; and
a tube-shape reflector formed between the IR light sources and the tube-shape barrier wall,
wherein the tube-shape reflector is configured to reflect some of IRs irradiated from the IR light sources at angles that exceed a half-power angle from the plurality of IR light sources to reach an external irradiation area exceeding the half-power angle of each of the plurality of IR light sources by widening the angles of the IR light.

19. The camera of claim 18, wherein the tube-shape reflector is attached to the tube-shape barrier wall to face in a direction towards the IR light sources.

20. A camera comprising:
a lens assembly;
a first plurality of infrared ray (IR) light sources arranged circularly around the lens assembly;
a second plurality of IR light sources arranged circularly between the lens assembly and the first plurality of IR light sources;
a tube-shape barrier wall surrounding the lens assembly, the tube-shape barrier wall formed between and spaced apart from the lens assembly and the second plurality of IR light sources;
a first reflector having a tube-shape formed between the first plurality of IR light sources and the second plurality of IR light sources; and
a second reflector having a tube-shape formed between the second plurality of IR light sources and the tube-shape barrier wall,
wherein the first reflector is configured so as to reflect some of IRs irradiated from the first plurality of IR light sources to reach an external irradiation area exceeding a half-power angle of each of the first plurality of IR light sources, and
wherein the second reflector is configured to reflect some of IRs irradiated from the second plurality of IR light sources to reach an external irradiation area exceeding a half-power angle of each of the second plurality of IR light sources.

* * * * *